US009551177B2

(12) United States Patent
Varadarajan et al.

(10) Patent No.: US 9,551,177 B2
(45) Date of Patent: Jan. 24, 2017

(54) ROTATIONAL TO TRANSLATIONAL LOCKING HINGE (71) Applicant: INTEL CORPORATION, Santa Clara, CA (US)

(72) Inventors: Krishnakumar Varadarajan, Bangalore (IN); Harish Jagadish, Bangalore (IN); Anand V. Reddy, Bangalore (IN); Madhukar Patil, Bangalore (IN); James Panakkal, Bangalore (IN); Guru Prakash, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/141,196

(22) Filed: Dec. 26, 2013

(65) Prior Publication Data
US 2015/0184438 A1 Jul. 2, 2015

(51) Int. Cl.
*E05D 11/10* (2006.01)
*G06F 1/16* (2006.01)

(52) U.S. Cl.
CPC ......... *E05D 11/1007* (2013.01); *G06F 1/1679* (2013.01); *G06F 1/1681* (2013.01); *Y10T 16/54025* (2015.01); *Y10T 29/24* (2015.01)

(58) Field of Classification Search
CPC .............. Y10T 16/54024; Y10T 16/540247; Y10T 16/54025; Y10T 16/540256; Y10T 16/540257; Y10T 16/54048; Y10T 16/5406; Y10T 16/5407; Y10T 16/5409; Y10T 16/54095; Y10T 16/5453; Y10T 16/5457; Y10T 16/551; Y10T 16/54028; Y10T 16/540255; Y10T 16/5387; F16M 11/10; F16M 11/24; F16M 11/2021; F16M 11/04; F16M 13/00; F16M 2200/041; F16M 2200/044; F16M 2200/047; F16M 2200/048; F16M 2200/08; Y10S 248/917; Y10S 248/919; E05D 11/10; E05D 11/1007; E05D 11/1028; E05D 11/105; E05D 11/1078; E05Y 2900/606; G06F 1/1681; G06F 1/1679; G06F 1/1601
See application file for complete search history.

(56) References Cited

U.S. PATENT DOCUMENTS

| | | | | | |
|---|---|---|---|---|---|
| 1,357,740 | A | * | 11/1920 | Stephan | A47C 17/12 16/364 |
| 5,503,361 | A | * | 4/1996 | Kan-O | A47B 21/0314 248/456 |
| 6,053,589 | A | * | 4/2000 | Lin | G06F 1/166 312/271 |
| 7,239,506 | B2 | * | 7/2007 | Ogawa | F16M 11/10 248/288.51 |

(Continued)

OTHER PUBLICATIONS

International Search Report with Written Opinion received for PCT Patent Application No. PCT/US2014/067076, mailed on Feb. 26, 2015, 15 pages.

*Primary Examiner* — Chuck Mah
(74) *Attorney, Agent, or Firm* — International IP Law Group, P.L.L.C.

(57) ABSTRACT

Techniques related to a hinge in a computing device are described herein. The techniques may include forming a shaft to move rotationally, and forming a sliding component to move translationally as a result of rotational movement of the shaft.

10 Claims, 7 Drawing Sheets

(56) References Cited

U.S. PATENT DOCUMENTS

| | | | | |
|---|---|---|---|---|
| 7,922,133 B2* | 4/2011 | Hsu | ...................... | F16M 11/10 248/127 |
| 8,226,054 B2* | 7/2012 | Chen | ...................... | F16M 11/10 16/337 |
| 2005/0109893 A1* | 5/2005 | Chueh | ................... | F16M 11/10 248/133 |
| 2005/0205725 A1* | 9/2005 | Yokouchi | ............... | F16M 11/24 248/125.1 |
| 2006/0147035 A1 | 7/2006 | Duan et al. | | |
| 2007/0023600 A1* | 2/2007 | Lee | ........................ | F16C 11/10 248/288.11 |
| 2007/0195495 A1* | 8/2007 | Kim | ...................... | F16M 11/10 361/679.07 |
| 2007/0262210 A1* | 11/2007 | Oh | ........................ | F16M 11/10 248/125.1 |
| 2007/0272809 A1* | 11/2007 | Jang | ...................... | F16M 11/04 248/133 |
| 2007/0278362 A1* | 12/2007 | Lee | ....................... | F16M 11/04 248/133 |
| 2008/0034541 A1 | 2/2008 | Duan et al. | | |
| 2009/0179133 A1* | 7/2009 | Gan | ...................... | F16M 11/04 248/422 |
| 2009/0189048 A1* | 7/2009 | Gan | ...................... | F16M 11/24 248/422 |
| 2010/0032532 A1* | 2/2010 | Jang | ...................... | F16M 11/04 248/122.1 |
| 2010/0071158 A1 | 3/2010 | Chen et al. | | |
| 2010/0171671 A1* | 7/2010 | Park | ...................... | F16M 11/10 343/720 |
| 2011/0126469 A1* | 6/2011 | Uto | ........................... | E02F 9/00 49/397 |
| 2011/0154614 A1 | 6/2011 | Chien | | |
| 2012/0102674 A1 | 5/2012 | King et al. | | |
| 2013/0044414 A1* | 2/2013 | Peng | ................... | H04M 1/0227 361/679.01 |
| 2013/0068902 A1* | 3/2013 | Huang | ................... | F16M 11/10 248/188.8 |
| 2013/0077211 A1* | 3/2013 | Wang | ................... | G06F 1/1637 361/679.01 |
| 2013/0286623 A1* | 10/2013 | Slipy | ................... | H04M 1/0202 361/807 |
| 2013/0305489 A1* | 11/2013 | Liang | ................... | G06F 1/1681 16/277 |
| 2014/0299602 A1* | 10/2014 | Manssourian | ........ | B65F 1/1615 220/315 |
| 2015/0211676 A1* | 7/2015 | Martin | ................. | G06F 1/1601 361/679.01 |

* cited by examiner

ROTATIONAL TO TRANSLATIONAL LOCKING HINGE

TECHNICAL FIELD

This disclosure relates generally to techniques for hinge systems of a computing device. Specifically, this disclosure relates to a hinge having a rotational shaft that results in translational movement of a sliding component.

BACKGROUND ART

Computing devices may include certain hinges to enable a user to adjust an angle of a component based on a given situation. With the fast growth of computing devices, lighter, thinner computing devices are increasingly preferred by users. In some scenarios, a computing device may include a portable All-in-One (AIO) wherein the display and the processing components are located within the same housing. A hinge may enable a user to adjust the angle of the display to achieve a desired viewing angle.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for implementing a hinge of a computing device wherein rotational movement is converted to translational movement of components that may be held in place and released from a held position using a locking mechanism. As discussed above, a hinge may enable a user to adjust the angle of the display to achieve a desired viewing angle. In this scenario, once a desired angle is achieved at a given angle, the embodiments described herein include a locking mechanism to inhibit movement of the hinge. The locking mechanism may be self-locking wherein the locking mechanism inhibits translational movement of the sliding component such that the locking mechanism applies increasing pressure to the sliding component based on an increasing force of movement associated with the sliding component.

Figure 1A:
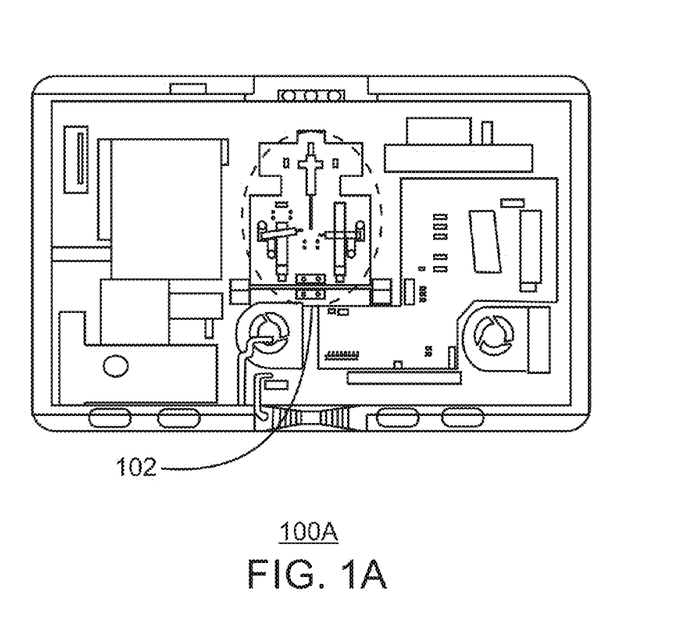
FIG. 1A is an illustration of a front view of a computing device including a self-locking hinge.

FIG. 1A is an illustration of a front view of a computing device including a self-locking hinge. The computing device 100 may be any type of computing device comprising a desktop computer, a All-In-One (AIO) computer, a laptop computer, a tablet computer, a mobile phone, and the like. The computing device includes a self-locking hinge 102. As discussed in more detail below, the self-locking hinge converts rotational movement into translational movement as well as providing a self-locking feature.

Figure 1B:
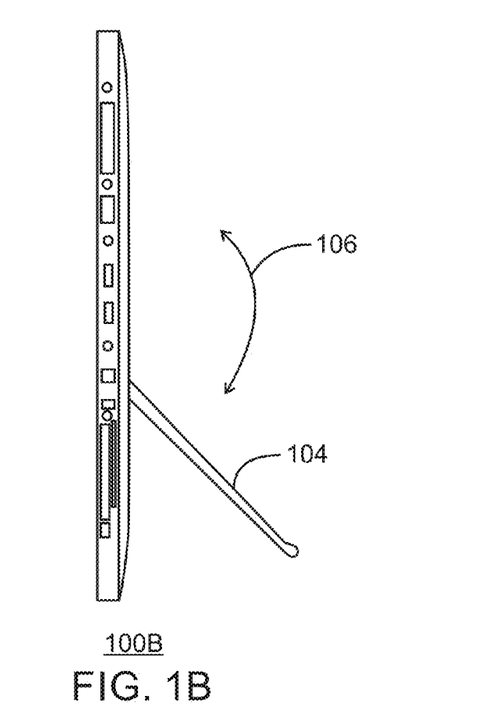
FIG. 1B is an illustration of a side view of a computing device having legs coupled to a self-locking hinge.

FIG. 1B is an illustration of a side view of a computing device having legs coupled to a self-locking hinge. The computing device 100 may include a stand 104. The stand may also be designed to additionally act as a handle. The stand 104 may be rotational as indicated by the arrow 106. In embodiments, the stand 104 may be legs configured to rotate about an axis defined by a rotational shaft of the self-locking hinge. As discussed in more detail below, rotation of the stand 104 may result in rotation of a shaft of the self-locking hinge 102, as well as translational movement of sliding components of the self-locking hinge 102.

Figure 2:
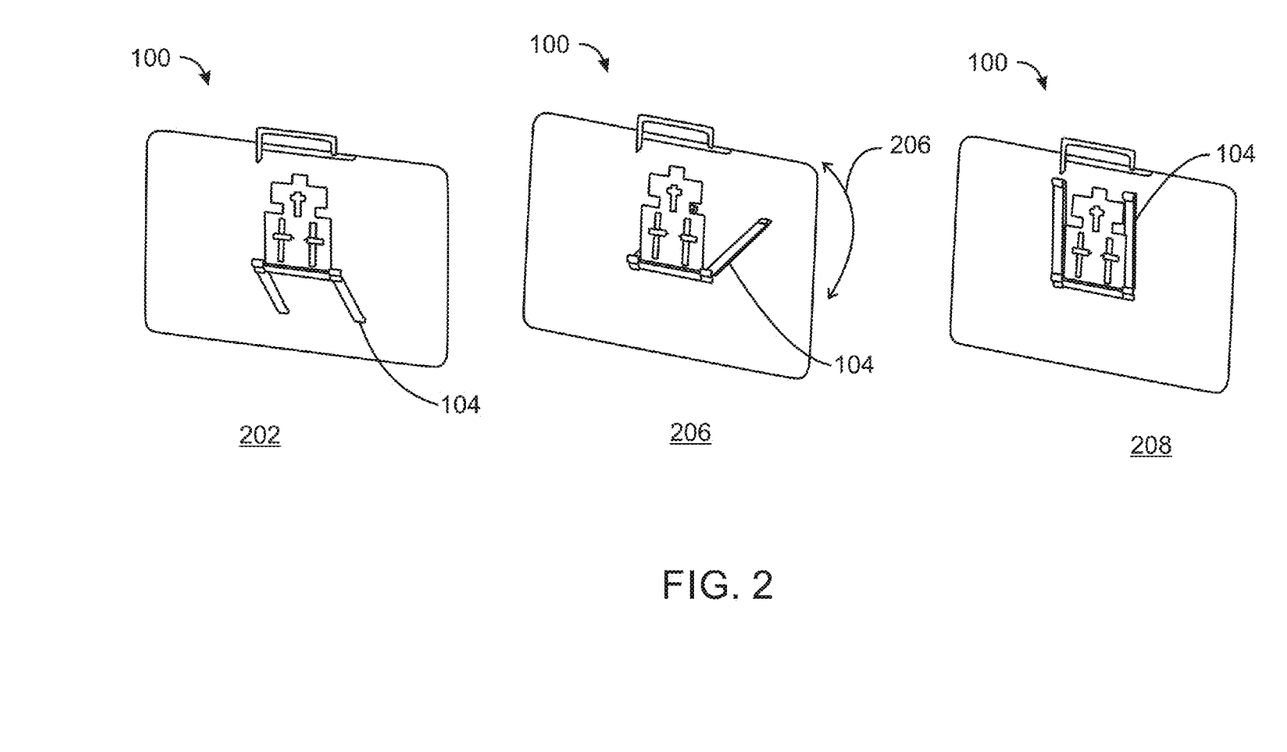
FIG. 2 is an illustration of rotational movement of legs of the computing device.

FIG. 2 is an illustration of rotational movement of legs of the computing device. At 202, the stand 104 is in an extended position enabling the computing device 100 to be in an upright position. At 204, the stand 104 is rotated, as indicated by the arrow 206, to be substantially perpendicular to a back side of the computing device 100. At block 206, the stand 104 is rotated to a closed position in which the stand 104 is substantially parallel to the back side of the computing device.

Figure 3:
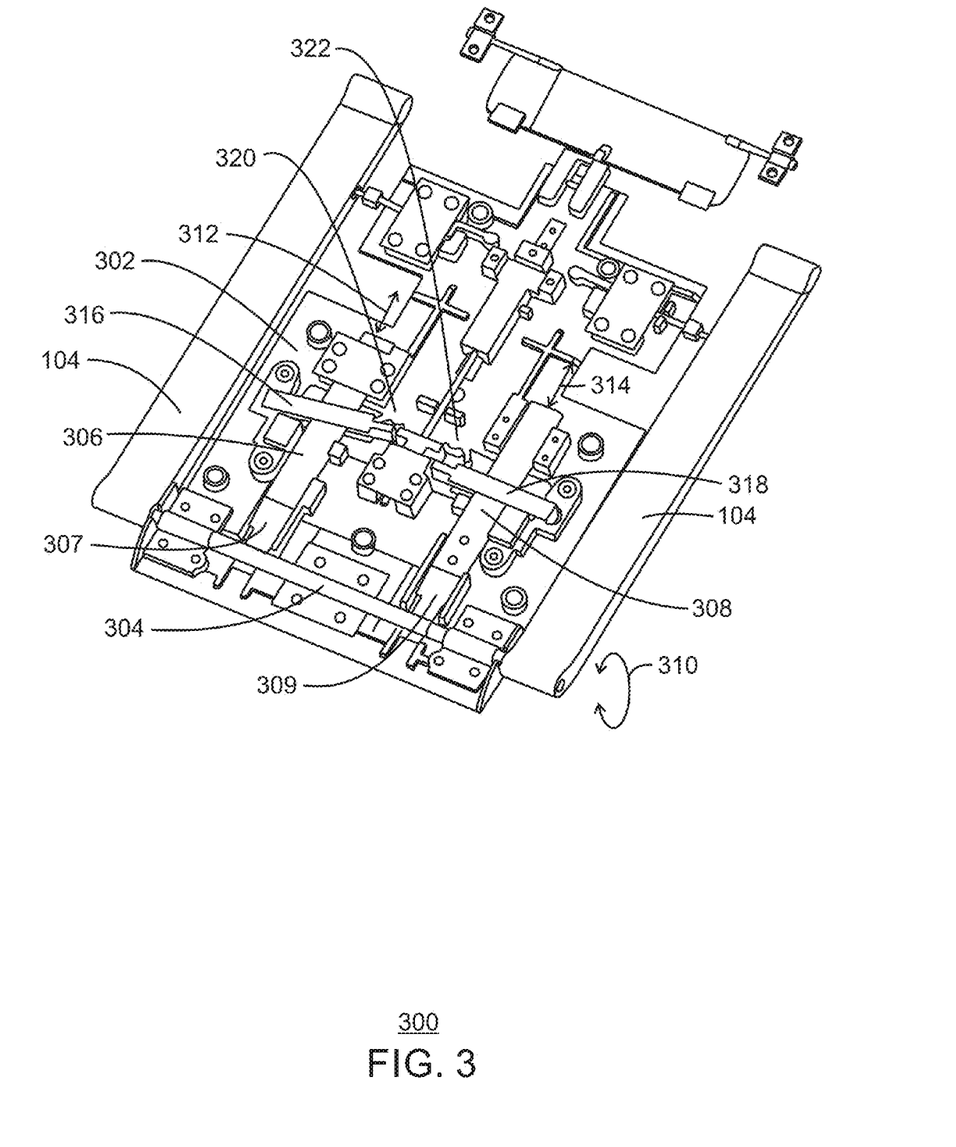
FIG. 3 is an illustration of a perspective view of a self-locking hinge of the computing device.

FIG. 3 is an illustration of a perspective view of a self-locking hinge of the computing device. As illustrated in FIG. 3, the stand 104 is in a closed position. In embodiments, the closed position is when the stand 104 is substantially parallel to a plane defined by a back plate, generally indicated at 302.

A self-locking hinge 300 may include a shaft 304. As discussed above, the hinge 300 may be self-locking such that a locking mechanism applies increasing pressure to sliding component 306, 308 based on an increasing force of movement associated with the sliding component 306, 308.

In the example embodiment illustrated in FIG. 3, the hinge 300 includes the backing plate 302, the shaft 300, a shaft 304, and a plurality of sliding components 306, 308. The shaft 304 may be coupled to the sliding components 306, 308 as indicated by 307, 309. The coupling components at 307, 309, may include ridges that can be engaged by the shaft 304 by ridges on the shaft 304. In this scenario, the ridges of the coupling components 307, 309 when in contact with the ridges of the shaft 304 may move the sliding components in opposite directions. Rotational movement, as indicated at 310, results in translational movement of the sliding components 306, 308, as indicated at 312 and 314. The self-locking hinge 300 may include a locking mechanism having locking components indicated at 316 and 318. As illustrated in FIG. 3, the locking components 316, 318 may define an opening through which the sliding components 306 and 308 may respectively move. As discussed in more detail below, the locking components 316 and 318 may inhibit movement of the sliding components 306 and 308. As illustrated in FIG. 3, levers 320 and 322 may be used to reduce the amount of force that is required to release the locking components 316 and 318.

Figure 4:
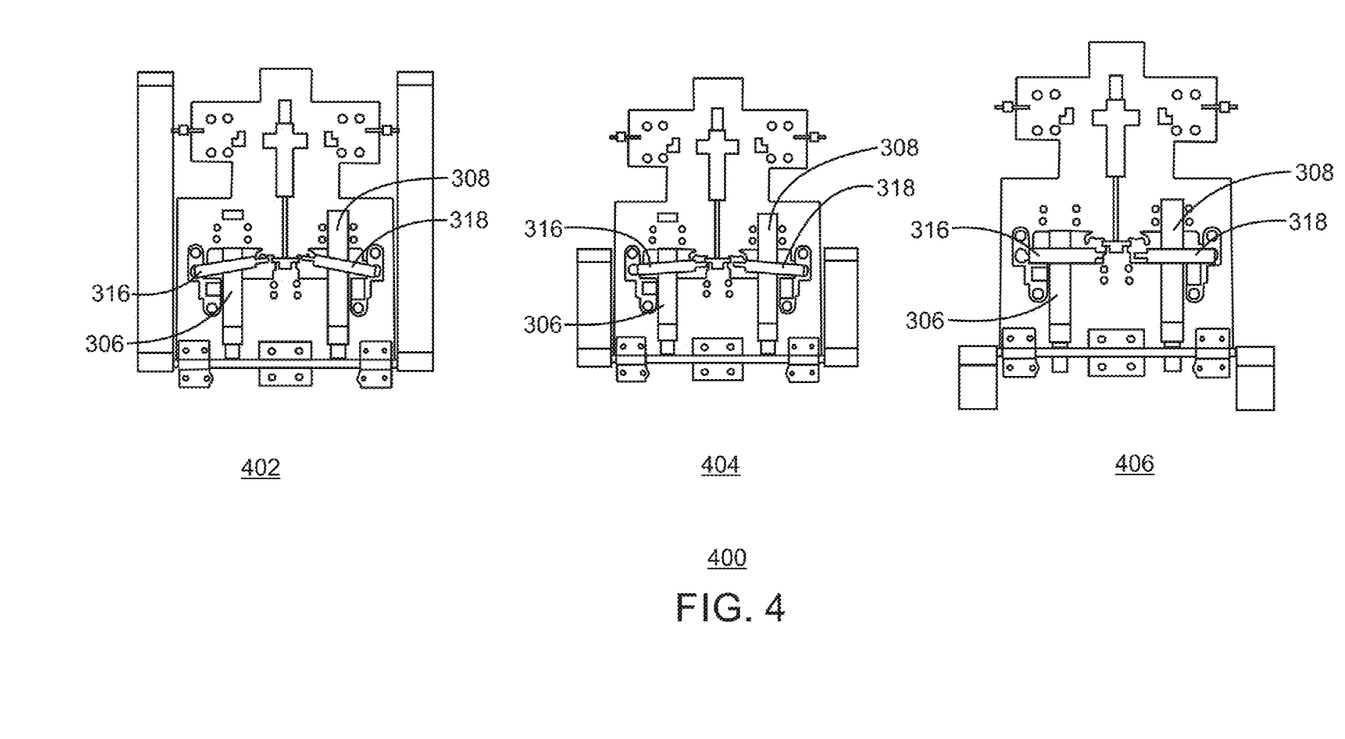
FIG. 4 is an illustration of a self-locking hinge wherein rotational movement of the shaft results in translational movement of sliding components.

FIG. 4 is an illustration of a self-locking hinge wherein rotational movement of the shaft results in translational movement of sliding components. As illustrated at the position 402, the locking components 316, 318 are not perpendicular to the sliding components 306, 308. In the position 402, the sliding components 306, 308 are inhibited from movement due to frictional forces occurring between the locking components 316, 318 and the sliding components 306, 308, respectively. At 404, the locking components 316, 318 are more perpendicular to the sliding components 306, 308 in comparison to the position 402, resulting in relatively less inhibition of movement of the sliding components 306, 308. At 406, locking components 316, 318 are more perpendicular to the sliding components 306, 308 in comparison to the position 402, and 404, resulting in relatively less inhibition of movement of the sliding components 306, 308.

The translational movement of the sliding components 306, 308 in FIGS. 3 and 4 may be one embodiment of translational movement that results from rotational movement of the shaft 304. Other embodiments are possible wherein rotational movement results in translational movement of sliding components in a self-locking mechanism.

Figure 5:
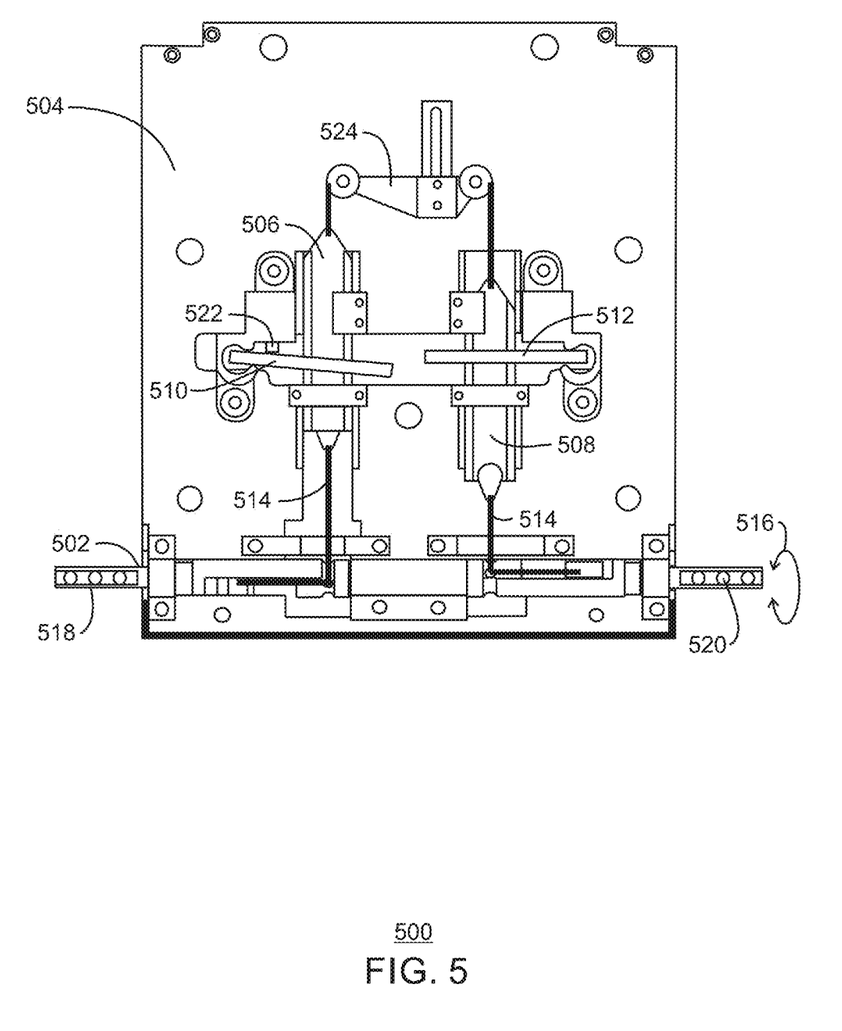
FIG. 5 is an example illustration of a self-locking hinge wherein cables couple the shaft to the sliding components.

FIG. 5 is an example illustration of a self-locking hinge wherein cables couple the shaft to the sliding components. The self-locking hinge 500 includes a rotational shaft 502, a backing plate 504, sliding components 506 and 508, and locking components 510 and 512. In this embodiment, the shaft 502 is coupled to the sliding components 506, 508 by cables, indicated at 514. Rotational movement in the shaft, as indicated at 516, results in translational movement of the sliding components 506, 508, each in an opposite direction from one another. The translational movement of the sliding components 506, 508 is a plane parallel to the backing plate 504. Similar to the self-locking hinge 300 discussed in relation to FIG. 3, locking components 512, 510 inhibit movement of the sliding components 506, 508 due to a force of friction respectively between the locking components 512, 510, and the sliding components 506, 508.

In embodiments, the self-locking hinge 500 includes a spring 522. The spring 522 is configured to apply pressure to at least one of the locking components, such as locking component 510. The spring 522 may apply pressure to create friction between the locking component 510 and the sliding component 506. Although not illustrated in FIG. 5, the self-locking hinge 500 may include multiple springs, such as a spring to apply pressure against the locking component 512. In embodiments, the force of friction may be configured to be less than a force exerted by a user when rotating the shaft 502 by movement of a stand (not shown) configured to be coupled to the shaft 502 as the fastening holes 518, 520 defined by the shaft 502. In some embodiments, the force of friction may be overcome mechanically, such as when a user adjusts an angle of a computing device by manual force, or electromechanically, wherein a user may initiate an electronic motor to adjust an angle of the computing device.

In embodiments, the self-locking hinge 500 includes a tensioner 524. The tensioner 524 is a tensioning mechanism configured to reduce flexes in the self-locking hinge between the cables 514, the sliders 506, 508, and the shaft 518.

Figure 6:
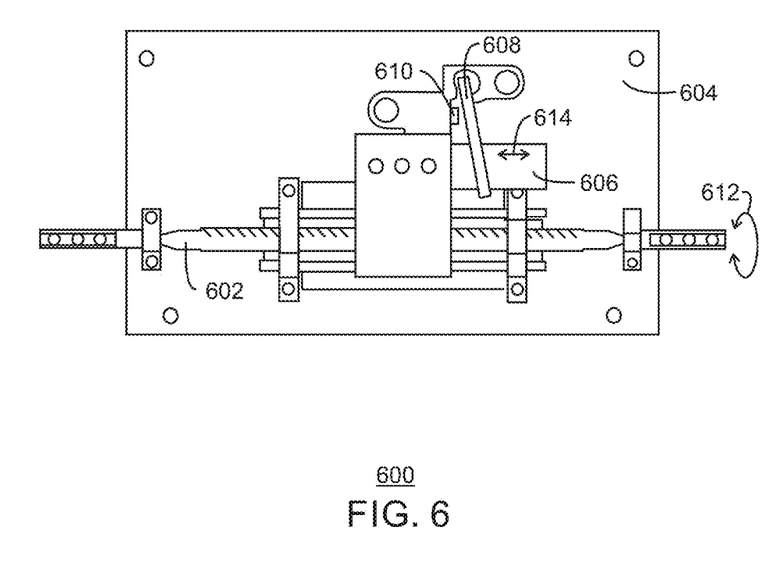
FIG. 6 is an example illustration of a self-locking hinge wherein rotational movement of the shaft results in translational movement of the sliding component parallel to the shaft.

FIG. 6 is an example illustration of a self-locking hinge wherein rotational movement of the shaft results in translational movement of the sliding component parallel to the shaft. The self-locking hinge 600 includes a shaft, 602, a backing plate 604, a sliding component 606, a locking component 608, and a spring 610. Rotation in the shaft 602, indicated by the arrow 612, may result in translational movement of the sliding component 606 as indicated by the arrow 614. Similar to the embodiments discussed above, the locking component 608 may inhibit movement of the sliding component 606 when the sliding component 606 is disposed at a non-perpendicular angle with respect to the locking component 608. In embodiments, the spring 610 may apply pressure to the locking component 608 such that a non-perpendicular angle of the locking component 608 may be achieved. As discussed above, rotational movement of the shaft 602 results in translational movement of the sliding component 606 in the plane of the backing plate 604.

Various self-locking hinge embodiments are discussed above. Other embodiments, such as a rack and pinion arrangement including one or more locking components are also contemplated.

Figure 7:
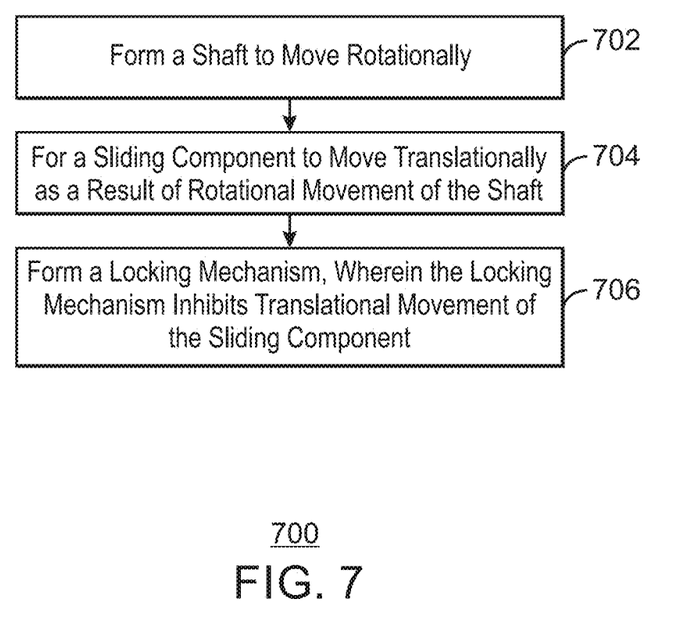
FIG. 7 is a block diagram illustrating a method for forming a hinge of a computing device.

FIG. 7 is a block diagram illustrating a method for forming a hinge of a computing device. The method 700 may include forming, at block 702, a shaft to move rotationally. The rotational movement of the shaft may enable a stand to swivel about an axis defined by the shaft, and about the back side of a computing device, such as an All-In-One (AIO) computing device. At block 704, a sliding component is formed. The sliding component is to move translationally as a result of rotational movement of the shaft.

The method 700 may also include forming, at block 706, a locking mechanism. The locking mechanism may include a locking component defining an opening, wherein the sliding component is to move translationally through the opening. The locking mechanism may include a spring to apply pressure to the locking component; wherein movement of the sliding component is inhibited by the pressure applied to the locking component.

Example 1

The techniques described herein include a method of forming a hinge for a computing device. The method includes forming a shaft to move rotationally and a sliding means, such as a sliding component, to move translationally as a result of the movement of the shaft. The method may also include forming a locking means. The locking means may be a locking mechanism used to inhibit translational movement of the sliding means.

The hinge may be formed of a material of relative high hardness. In some scenarios, the hinge is formed through a mechanical, chemical, or metallurgical means to increase a hardness of the hinge.

The locking means includes a locking component. The locking component may have an opening wherein the sliding means can translationally move through the opening. The locking means includes a spring to apply pressure to the locking component. In some scenarios, the movement of the sliding means is inhibited by the pressure applied to the locking component.

Example 2

The embodiments described herein include a hinge for a computing device. The hinge includes a shaft to move rotationally and a sliding means, such as a sliding component, to move translationally as a result of the movement of the shaft. The hinge may also include a locking means. The locking means may be a locking mechanism used to inhibit translational movement of the sliding means.

The locking means includes a locking component. The locking component may have an opening wherein the sliding means can translationally move through the opening. The locking means includes a spring to apply pressure to the locking component. In some scenarios, the movement of the sliding means is inhibited by the pressure applied to the locking component. In one scenario, the movement of the sliding means is relatively uninhibited by the locking means when the locking component is perpendicular to the sliding means in comparison to when the locking component is not perpendicular to the sliding means.

The hinge may also include a backplate to couple the shaft to a backside of the computing device. The translational movement of the sliding means is in the plane of the backplate.

Example 3

The embodiments described herein include a hinge system for a computing device. The hinge system includes a backplate coupled to a backside of a display of the computing device. The hinge system also includes a shaft to move rotationally and a sliding component move translationally as a result of the movement of the shaft. The sliding component is to move translationally in a plane defined by the backplate.

The hinge system may also include a locking mechanism. The locking means may be a locking mechanism used to inhibit translational movement of the sliding component. The locking mechanism includes a locking component. The locking component may have an opening wherein the sliding component can translationally move through the opening. The locking mechanism includes a spring to apply pressure to the locking component. In some scenarios, the movement of the sliding component is inhibited by the pressure applied to the locking component. In one scenario, the movement of the sliding component is relatively uninhibited by the locking mechanism when the locking component is perpendicular to the sliding component in comparison to when the locking component is not perpendicular to the sliding component.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A hinge for adjustably connecting a display to a support of a computing device, comprising:
   a shaft with a plurality of ridges adapted to be fixedly mounted to the support and rotationally mounted to the display;
   at least one sliding component adapted to be mounted to the display and to move translationally as a result of rotational movement of the shaft, wherein a plurality of ridges in the sliding component are operatively coupled to the plurality of ridges of the shaft; and
   at least one locking mechanism, wherein the locking mechanism is activated by said sliding component and releasably inhibits translational movement of the sliding component via locking components that are configured to apply a force to the sliding components, wherein the locking mechanism is self-locking such that the locking mechanism applies increasing pressure to the sliding component based on an increasing frictional forces between the sliding component and the locking mechanism, each locking component defining an opening, wherein the sliding component is to move translationally through the opening; and
   a spring to apply pressure to each locking component, wherein movement of the sliding component is inhibited by the pressure applied to each locking component resulting in an increased pressure on the sliding component.

2. The hinge of claim 1, wherein movement of the sliding component is relatively uninhibited by the locking mechanism when the locking component is in a position perpendicular to the sliding component, and the movement of the sliding component is inhibited when the locking component is in a position not perpendicular to the sliding component.

3. The hinge of claim 1, comprising a back plate adapted to couple the shaft to a back side of the computing device, wherein the translational movement of the sliding component is in a plane of the back plate.

4. The hinge of claim 1, comprising legs as the support of the computing device, wherein the shaft is to be coupled to the legs such that rotation of the legs results in rotational movement in the shaft, translational movement of the sliding components.

5. The hinge of claim 1, wherein the hinge is for an all-in-one (AIO) computing device.

6. A hinge system for adjustably connecting a display to a support of a computing device, comprising:
   a backplate to be coupled to a back side of a display of the computing device;
   a shaft with a plurality of ridges adapted to be fixedly mounted to the support and rotationally mounted to the display; and
   at least one sliding component adapted to be mounted to the display and to move translationally in a plane defined by the backplate as a result of rotational movement of the shaft, wherein a plurality of ridges in the sliding component are operatively coupled to the plurality of ridges of the shaft;
   at least one locking mechanism, wherein the locking mechanism is activated by said sliding component and releasably inhibits translational movement of the sliding component via locking components that are configured to apply a force to the sliding components, wherein the locking mechanism is self-locking such that the locking mechanism applies increasing pressure to the sliding component based on an increasing frictional forces between the sliding component and the locking mechanism, each locking component defining an opening, wherein the sliding component is to move translationally through the opening; and
   a spring to apply pressure to each locking component, wherein movement of the sliding component is inhibited by the pressure applied to each locking component resulting in an increased pressure on the sliding component.

7. The hinge of claim 6, wherein movement of the sliding component is relatively uninhibited by the locking mechanism when the locking component is in a position perpendicular to the sliding component, and the movement of the sliding component is inhibited when the locking component is in a position not perpendicular to the sliding component.

8. The hinge system of claim 6, comprising legs as the support of the computing device, wherein the shaft is to be coupled to the legs such that rotation of the legs results in rotational movement in the shaft, translational movement of the sliding components, and rotational movement in the backplate.

9. The hinge system of claim 6, wherein the hinge is for an all-in-one (AIO) computing device.

10. The hinge system of claim 6, wherein the hinge is composed of a material of high hardness, or has been processed through mechanical, chemical, or metallurgical processes to increase a hardness of the hinge.

* * * * *